Jan. 11, 1944.    L. C. WATERMAN    2,338,986
PROCESS AND APPARATUS FOR SEPARATING DISPERSIONS OF OIL AND WATER
Filed Aug. 10, 1938
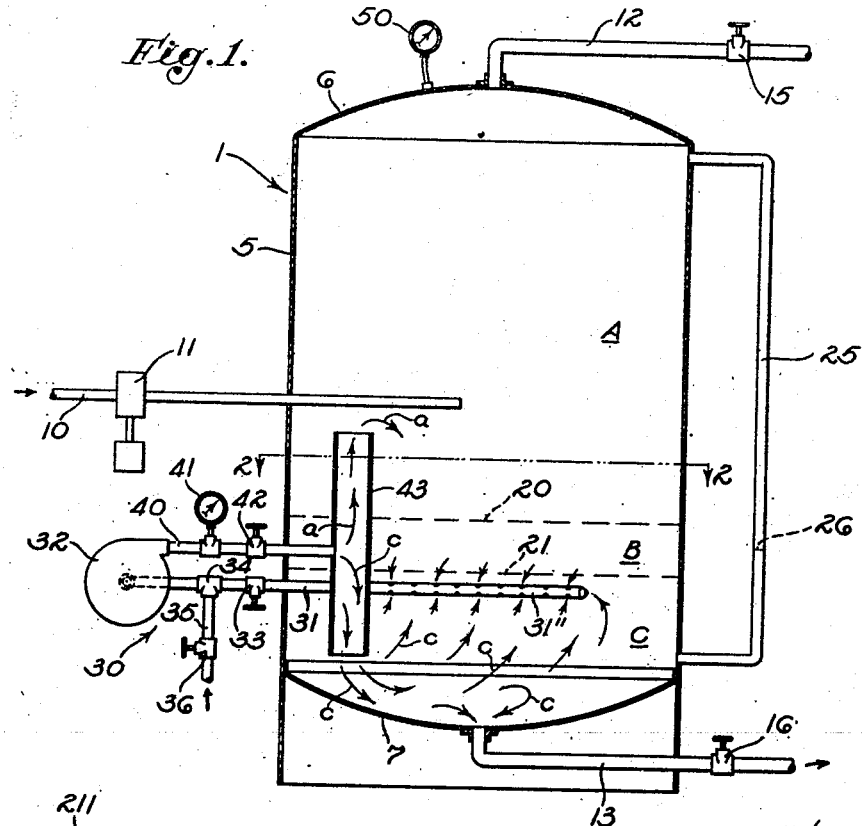
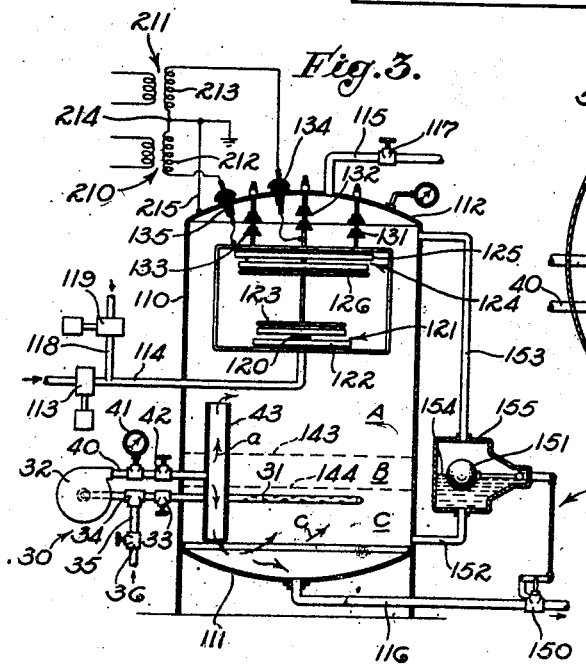
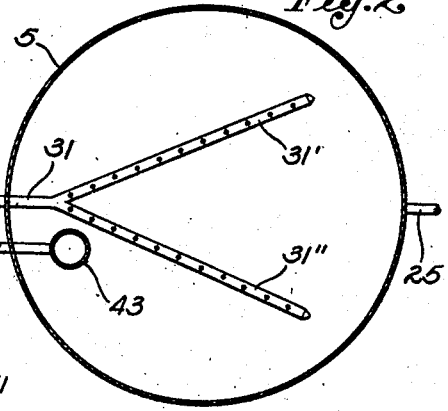
INVENTOR
LOGAN C. WATERMAN
BY HARRIS, KIECH, FOSTER & HARRIS
FOR THE FIRM
ATTORNEYS.

Patented Jan. 11, 1944

2,338,986

UNITED STATES PATENT OFFICE 2,338,986

PROCESS AND APPARATUS FOR SEPARATING DISPERSIONS OF OIL AND WATER

Logan C. Waterman, Houston, Tex., assignor, by mesne assignments, to Petrolite Corporation, Ltd., Wilmington, Del., a corporation of Delaware Application August 10, 1938, Serial No. 224,098

13 Claims. (Cl. 210—54)

This invention relates to a process and apparatus for treating oil and, more particularly to a process and apparatus for the separation of constituents of emulsions or dispersions.

When a temporary mixture of water and oil is allowed to settle, a more or less stable emulsion frequently collects at the interface between the stratified bodies of oil and water. The separation of this interfacial emulsion into its constituent phases usually requires a more prolonged period of settling than that required for the stratification of the main bulk of oil and water into separate layers. Similarly, when a relatively stable dispersion of water and oil, for instance an emulsion of brine in crude oil, is chemically or electrically treated to produce settling, there ensues with more or less rapidity stratification of the larger part of the oil and water into layers, separated by an intermediate layer of a coarse emulsion.

The settling period required for the complete resolution of this coarse interfacial emulsion, or "sludge" as it is called in the art, is a protracted one. It serves to slow up any process designed to separate oil from water. For example, in the continuous separation of crude oil emulsions by electric treatment, great care must be taken that the rate of throughput does not cause this sludge to be formed faster than it will naturally break, since otherwise the interfacial layer of coarse emulsion or sludge will grow to such volume that it either extends upwardly into the oil layer to such an extent that it short-circuits the electrodes or downwardly into the water layer to such an extent that substantial portions thereof are drawn off with the water bleed, or both.

On quiescent settling, more or less well-defined lines of demarcation may exist between the sludge layer and the water layer, and a somewhat less well-defined line of demarcation may similarly exist between the sludge layer and oil layer. In continuous processes, however, the sludge will usually be found in more or less diffused condition throughout the central portion of the settling zone, but concentrated primarily near the plane where the continuous phase changes from water to oil. The concentration of sludge in the water layer below this discontinuity of the continuous phase gradually decreases and drops to substantially zero in the bottom-most portions of the body of water, from which water is bled from the settling zone, provided the process is operating satisfactorily. Frequently, however, and particularly with high throughput rates, the sludge content in the water layer tends to build up to such an extent that several per cent or more of the sludge emulsion is continuously withdrawn with the bleed water. This is particularly true when large volumes of water have been more or less tightly dispersed in the oil for washing or other purposes, since the tightness of the original emulsion tends to result in the formation of more sludge of greater stability and also since the greater water content of the oil being treated necessitates a more rapid water bleed, thereby favoring entrainment of the sludge in the bleed.

This sludge contains masses of water which are temporarily held intact by surrounding sacs comprising tenacious oily membranes, the composition of which is not definitely known. In addition to its oil content, the material forming these membranes may contain emulsified water as well as other materials which account for its resistance to rupture. Entrained in a mass of such water-containing pellets will be material amounts of oil and free water. Resolution of the sludge by the present process comprises a freeing of this oil and water and a breaking of the membranes to free the water therein, leaving the ruptured skin-like membranes which may be continuously removed with the oil or which may gradually accumulate in the interfacial zone to be periodically removed when, after several weeks' operation, they accumulate to an objectionable degree. The freed oil and water gravitate to the corresponding bodies of these materials. Vigorous agitation of such a sludge with a small amount of water has been found to form an extremely tight emulsion defeating the end desired of the process of the present invention. However, it has now been unexpectedly found that, if this agitation is effected with a large predominance of water, a considerable back pressure can be imposed on the circulating pump and very considerable agitation used, without increasing the tightness of the sludge materials and, in fact, serving to resolve them in large measure.

The throughhput of a settling chamber is limited by sludge formation and, if gravitational action is relied upon to resolve this sludge, the process is necessarily prolonged. By use of the present invention, clean water bleeds are insured and the throughput of the system is very materially increased.

It is an object of the present invention to provide a method and apparatus for the rapid resolution of the coarse interfacial emulsion or sludge that is formed when a dispersion of water and oil is allowed to settle, to the end that a separation of cleaner water is obtained and greater throughputs made possible with a given piece of separating equipment.

It is, furthermore, an object of the present invention to provide a process and apparatus for clarifying water separating from an emulsion of oil and water, and to free it of entrained sludge, and at least partially to resolve the latter into its oil and water constituents.

It is, furthermore, an object of the invention to provide a process and apparatus for the vigorous agitation of coarse sludge emulsions in the presence of substantial quantities of free water, and to provide processes and apparatus for insuring that the total water content of the mixture being agitated is greater than corresponds to certain critical limits.

The invention resides broadly in the agitation of the sludge with substantial quantities of free water whereby the sludge is resolved into its oil and water components, and resides more particularly in the withdrawal of the sludge from the settling zone and the subjection of a commingled stream of free water and said sludge to substantial agitation, such as afforded by pumping the mixture through a partially closed valve for example, whereby the sludge is so conditioned that it rapidly separates on subsequent settling into its oil and water components. The invention also embraces the withdrawal from the settling zone of a commingled stream of ascending water and descending sludge, and the introduction of water to the settling zone in such manner as to maintain the ascending current of water. The invention further resides in apparatus adapted to carry out this process.

Further objects and aspects of the invention will be apparent from the following.

Referring to the drawing:

Figure 1 is a vertical cross section of a settling chamber provided with a device embodying my invention.

Figure 2 is a plan section taken along line 2—2 of Figure 1.

Figure 3 illustrates my invention adapted for use in conjunction with an electric treater for breaking and resolving emulsions occurring naturally or made artificially.

Referring more particularly to Fig. 1, 1 is a settling tank comprising a cylindrical shell 5 closed at top and bottom by heads 6 and 7. The emulsion which is to undergo settling is introduced into the settling tank 1 by means of pipe 10 and pump 11. The incoming emulsion is of such character as to settle gradually in the settling tank 1 into free oil and free water, and may be, for example, an emulsion which has been previously disestablized by electrical or chemical treatment, or the like. Free oil and free water are drawn off through pipes 12 and 13 which respectively tap the top and bottom of the settling tank. Valves 15 and 16 are provided in the draw-off lines for maintaining any desired back pressure on the settling zone and for maintaining the relative draw-off of oil and water in the proper production ratio, whereby the proper level may be maintained in the settling tank 1.

As previously described, the settling emulsion stratifies into a layer of oil A, a layer of water C, and an interfacial or intermediate layer of coarse sludge B. The approximate boundaries of layer B are indicated by the dotted lines 20 and 21, although in practice, and particularly in the case of a continuous process, there is a tendency for the sludge B to drift down into the water layer C so that, in the absence of my invention, no sharp boundary 21 would be found and the sludge might be found in diminishing concentration clear to the bottom of the settling zone. The settling tank 1 is provided with a side passage which includes a sight glass 25 in which the oil-water interface 26 may be observed, thus giving an approximate indication of the position of layer B, thereby permitting valves 15 and 16 to be adjusted so as to maintain the appropriate level. Means, such as shown in Figure 3, may be used in conjunction with the side passage for automatically controlling the rate of withdrawal of the water to maintain the oil-water interface 26 in substantially constant position.

My water-clarifying and sludge-resolving device 30 comprises a perforated suction pipe 31 taking suction more or less uniformly across the entire cross section of the settling zone at the indicated level. The precise form of the suction pipe 31 is not important but, in general, it is preferable that the suction be distributed more or less uniformly over the cross section of the settling tank. The plan view in Figure 2 shows pipe 31 as a branching Y comprising arms 31' and 31" perforated on the top and bottom. Various other shapes and modifications may be used, however, bearing in mind that it is advantageous to distribute the suction with some degree of uniformity over the cross section of the treater.

The pipe 31 is continued through the wall of the settling zone to the suction intake of a centrifugal pump 32. Exterior to the settling zone, the suction pipe 31 is provided with a valve 33 and a T connection 34, the latter communicating with a pipe 35 provided with a valve 36, this latter arrangement providing a means for the addition of water or chemical to the withdrawn stream, as hereinafter explained. The discharge of the pump 32 is conducted through a discharge pipe 40 provided with a pressure gauge 41, past a valve 42 and into an auxiliary settling zone 43 positioned within the main settling tank 1. The auxiliary settling zone 43 is formed as a vertically-disposed cylindrical shell open at both ends and extending a substantial distance above and below the level of the suction intake pipe 31. It is preferable that the auxiliary settling zone 43 be extended upward at least into sludge layer B and, preferably, into the oil layer A, as illustrated. The lower end of the auxiliary settling zone 43 is in communication with the water layer C at a point intermediate the level of the suction intake 31 and the bottom of the settling tank from which water is bled through pipe 13.

The operation of the device may be described with reference first to the condition in which the water-sludge mixture is moved to the clarifier at a rate substantially greater than the rate of water withdrawal through pipe 13, and preferably cycled at a rate from two to seven times the rate of water withdrawal. Under these circumstances, pipe 31 is taking in substantially more fluid than corresponds to the rate of sludge formation or to the maximum possible rate of migration of the sludge layer downward in response to withdrawal of water from pipe 13. The mixture withdrawn by the suction of the pump thus comprises only a relatively small proportion of sludge and a relatively large proportion of water, and I have found that the sludge contained in such a mixture may be broken by vigorous agitation, such as produced by movement through a pump or a restricted orifice, or both. The beating of the centrifugal pump and, in particular, the throttling action of either valve 33 or 42 set up sufficient turbulence in the moving stream to break at least the major portion of the entrained sludge. The broken sludge membranes and any oil liberated are free to rise in the auxiliary settling zone 43 to join the material in the main oil zone A, as shown by the arrows a. The main bulk of the moving stream comprises water and settles in the auxiliary settling zone downwardly and out into the water layer 60, as indicated by the arrows c. The water thus discharged into the lower part of the water layer C rises, for the most part, in answer to the continued suction in pipe 31, a small portion of the water, however, being diverted to the water bleed pipe 13 in accordance with the setting of valve 16.

The suction pipe 31 thus defines a very definite lower limit beyond which the sludge layer B will never extend. In practice, the region above the pipe 31 is also found to be substantially well clarified and to contain only minor portions of entrained sludge so that, under equilibrium conditions following prolonged operation, the amount of sludge in the fluid moving to the pump 32 may be as low as 1% or 2%, the remainder of the fluid being free water. In one instance in which my device had been in steady operation for some time, samples withdrawn from petcocks below the level of the suction pipe 31 were found to contain substantially no sludge, while samples withdrawn from the suction level showed a sludge content of about 2%, the remaining 98% being free water. The 2% of sludge comprised about 50% emulsified water and 50% oil. At a point about 10 inches above the pump suction, samples were obtained which, upon centrifuging, showed about 80% free water and 20% sludge, the latter having a water content of about 50%. At a point 20 inches above the suction of the pump, there was somewhat over 40% of sludge as found by sampling through petcocks.

In the test just mentioned, the feed to the suction of the pump contained about 98% free water and 2% of sludge, or about 99% total water and 1% of oil. Under these conditions, my water clarifier and sludge breaker operates very successfully but it may also operate on mixtures comprising substantially more sludge, such as may arise when the sludge layer B is close to or adjacent the suction pipe 31, or when very substantial amounts of sludge are entrained into the water space lying above suction pipe 31. I find, however, that successful clarification of the water and resolution of the sludge is not assured unless the total water content of the mixture fed to the suction of the pump is 80%, or greater. I also find that, when the total water content of this mixture falls as low as 60%, clarification of the water and breaking of the sludge can rarely be obtained.

These limiting concentrations of the total water content are critical only with regard to the breaking and resolution of the sludge by the subsequent vigorous agitation and, for this purpose, it is frequently immaterial how the desired composition is obtained. For example, I may, if desired, control the composition within the desired limits of total water content by drawing from the container a material richer in sludge and adding water to the suction of the pump through pipe 35 and valve 36, or I may provide a plurality of suction intakes at different levels in the water layer C and selectively throttle them into a manifold leading to the intake of the pump in order to obtain the desired composition. Under the conditions discussed above, however, in which the rate of fluid movement through the clarifying unit is substantially greater than the rate of water withdrawal, the proper composition is insured substantially automatically for, in general, the sludge layer B will not migrate downwardly more rapidly than is necessary to replace water withdrawn through pipe 13 and, hence, the normal maximum rate of entry of sludge into the sphere of suction of the pipe 31 corresponds to the rate of withdrawal of water. Since, however, the pump 32 is withdrawing fluid at a rate several times the rate of water withdrawal, the feed to the pipe 31 will comprise an abundance of water.

The required degree of agitation is afforded by adjusting either or both of the throttling valves 33 or 42. In general, I prefer to provide the required agitation by adjustment of the valve 42 on the pressure side of the pump. I find it convenient to adjust the valve 42 with relationship to the pressure drop thereacross, as indicated by the comparative pressure readings on the pressure gauge 41 responsive to the pump pressure, and a pressure gauge 50 responsive to the pressure in the settling tank.

When the sludge comprises fairly small particles or pellicles around $\frac{1}{16}$ inch in diameter, I usually adjust the valve 42 to give a pressure drop of about 10 lbs./sq. in., or somewhat higher. If working on very loose sludge in which the pellicles are substantially larger, the agitation provided by a pressure drop of 1 lb./sq. in. may be sufficient. Very much higher pressure drops, however, for example over 50 lbs./sq. in. may be used, if desired.

After passage of the mixture through the valve 42, the subsequent handling is somewhat optional. The agitation will be found to have resulted in the rupture of the major portion of the sludge membranes and the freeing of the enclosed water, as well as the entrained oil and water, so that quiescent settling in any suitable zone will result in the formation of free oil, free water, and possibly a slight interfacial layer which, however, no longer represents an emulsion of the sludge type and which consists largely of remnants of the sludge membranes. It is usually convenient, however, to effect the settling of this broken mixture in the main settling zone and to re-introduce the mixture to the main settling zone for this purpose. While the use of the auxiliary settling zone 43 has certain advantages, as herein set forth, it may, if desired, be dispensed with and the discharge from the valve 42 introduced anywhere into the settling tank, preferably, however, at such a point or points as not to directly short-circuit the discharge and suction.

By discharging the material into an auxiliary settling zone 43 which is in open communication with the water layer C at a point somewhat below the suction and which is in open communication at its upper end with a non-aqueous layer, such as the sludge layer B or the oil layer A, a path is defined for the water separating from the discharged material, which is indicated schematically by the arrows c. There is thus provided an ascending current of water throughout the middle portion of the water layer C and extending upward to the suction pipe 31 which provides an effective barrier to the downward migration of any sludge past the suction intake, and the water bled from the bottom of the settling tank is thereby kept completely free from any entrained sludge.

The lighter portion of the broken sludge, comprising free oil and a small proportion of sludge membranes which are soluble neither in oil nor in water, rises upwardly in the auxiliary settling zone 43 to join the main body of oil A, from whence any membranous material may subsequently re-enter layer B. There may eventually build up in this manner in the sludge layer B an accumulation of membranous material. However, the quantity of this membranous material which is formed is so small that usually several weeks of continuous operation are possible before it is necessary to shut down and remove the accumulated debris present in the layer B.

While centrifugal pumps, such as the illustrated pump 32 of the drawing, will be found convenient, various other pumps may be used, such as steam reciprocating pumps, water pumps, and the like.

Referring more particularly to Figure 3, there is shown an electric treater comprising a cylindrical shell 110 closed at its bottom and top by heads 111 and 112. Emulsion to be treated is introduced to the treater by means of a pump 113 and a line 114. Treated dry oil is removed through a line 115. Separated water is removed through a bleed line 116. In desalting or removing impurities from certain relatively dry oils, it is often desired to mix relatively fresh water therewith to produce the resulting emulsion or dispersion to be treated. In this instance, water can be introduced into the pipe 114 through a pipe 118 under the action of pump 119 and any suitable auxiliary mixing device can be used, if desired, to determine the degree of mixing.

The emulsion introduced into the treater by means of the line 114 is ejected horizontally by means of an emulsion head 120 into a treating space 121 defined by electrodes 123 and 122. An upper additional treating space 124 is provided by electrodes 125 and 126. The electrodes 126 and 123 are mechanically and electrically connected, and this assembly is suspended from the head 112 by means of an insulating member 132, and electrically energized by means of a high-tension lead introduced through an insulator 134. The electrodes 125 and 122 are electrically and mechanically connected and are suspended from the head by means of insulating members 131 and 133, this assembly being energized by a separate high-tension lead introduced through an insulating member 135.

The electric field in the treating space 121 acts on the incoming emulsion and so changes its characteristics that the water particles subsequently settle therefrom more or less rapidly. The action of the electric field usually involves more or less coalescence of minute particles of water to form larger masses of water which are susceptible to gravitational separation. The treater is shown as provided with the additional treating space 124 in which the rising oil is further subjected to the action of an electric field whereby some further quantity of dispersed water may be caused to separate or coalesce. Such an additional treating field is not always necessary and may be dispensed with, if desired. Most of the water has dropped from the oil by the time it reaches the top of the treater, and the treated oil removed through the pipe 115 usually contains only a fraction of one per cent of water.

Various electrical circuits may be used to energize the electrodes, that shown comprising transformers 210 and 211 with secondary windings 212 and 213 respectively, the secondaries being combined additively with a grounded tap 214 between them. The ungrounded terminals of the secondaries are brought to electrodes 125 and 126 through insulators 135 and 134 respectively.

The water particles descend toward the bottom of the treater and become completely coalesced to form a body of separated water C extending upwardly to the level indicated as 144. The layer B between the levels 143 and 144 represents the sludge layer consisting for the most part of a coarse grained flocculent emulsion such as has been previously described as collecting at the interface. The oil layer A extends from the upper limit 143 of the sludge layer B to the top of the treater. The water level 144 is maintained at substantially constant height by withdrawal of the water through the bleed line 116 at a rate corresponding with the rate at which water gravitates into the layer C. The rate of withdrawal may be manually adjusted, if desired, but I prefer to use automatic devices adjustable to maintain the proper levels in the treater.

Float 151 is housed in a chamber 155 communicating upwardly through a pipe 153 with the oil layer A and communicating at the bottom portion through a pipe 152 with the water layer C. The water and oil flowing into the chamber 155 through the pipes 152 and 153 respectively establish an interfacial level 154 which fluctuates in correspondence with any fluctuations of the water level 144 in the interior of the treater. These two levels are not necessarily identical in height, however, due to the fact that the sludge in the layer B has a density intermediate that of oil and water. The float 151 is of such density as to follow the position of the interface 154, and any motion thereof is communicated by means of suitable linkages 156 to a valve 159 in the pipe 116, opening this valve when the level rises and closing the valve when the level falls, thereby maintaining the level.

While the sludge has been represented in the drawing as existing only in layer B, this is true only of the bulk of the sludge and, in the absence of the invention and during continuous operation at high throughput rates, considerable quantities of the sludge will tend to migrate or be drawn below this layer into the water layer, particularly coarse portions of the sludge and especially pellicles or skins of oil surrounding water droplets of $\frac{1}{16}$ of an inch in diameter or greater, the density of which is accordingly not far from that of the water itself.

I find that the type of coarse dispersion which tends to move into the water layer and, if unresolved, to eventually pass out with the water bleed is readily broken by agitation with water according to the method of my invention. Accordingly, I provide the electric treater with the water clarifier and sludge resolver 30, the numbered parts of which and their disposition relative to the layers A, B, and C are the same as shown and discussed in connection with Figure 1.

I find that my device is particularly well adapted to the work in conjunction with electric treaters of the type described. On the one hand, its use greatly improves the efficiency and increases the throughput of the treater, particularly when operating on emulsions of high water content, such as emulsions containing 10% to 15% or more of water produced in desalting processes involving the dispersion of fresh water in oil. On the other hand, an electric treater usually forms a type of sludge which is particularly amenable to treatment by my process and apparatus, for example, a sludge consisting of oily pellicles or sacs $\frac{1}{10}$ of an inch in diameter or more which are filled with water, these pellicles or sacs clustering together to give a coarse honeycombed structure. On treating such a sludge according to my method, the pellicles or sacs are ruptured, the water therein is set free, and, likewise, the major portion of the oil entrapped in or associated with the pellicles or skin is also set free. While I refer to the sludge thus treated as broken, there may remain for eventual disposal a small amount of membranous material which is soluble neither in the water nor in the oil, as discussed hereinabove. The material accumulates at a relatively slow rate, however, and in commercial installations does not require special consideration oftener than once every few weeks.

Obvious changes may be made in my apparatus and procedure without departing from the spirit of the invention.

I claim as my invention:

1. A process for treating coarse interfacial sludge comprising globules of water encased in oily membranes and which sludge forms in a settling zone as a sludge layer between oil-continuous and water-continuous bodies when a dispersion of oil and water is settled in said zone, which process includes the steps of: withdrawing a portion of sludge from said sludge layer while combining therewith a portion of water from said water-continuous body to form a mixture containing at least 80% of water; subjecting this mixture to agitation to break down some of the sludge globules; and returning the constituents of the agitated mixture to said settling zone.

2. A process for preventing the entrainment of oil and sludge by water settling from a dispersion of water and oil continuously delivered to a settling zone in which the constituents of the dispersion settle to form an upper body of oil-continuous material, a lower body of water-continuous material, and an intermediate layer of sludge comprising globules of water surrounded by oily material, which process includes the steps of: separately withdrawing oil-continuous and water-continuous materials respectively from the upper and lower ends of said settling zone at such controlled rates as to maintain said intermediate layer of sludge substantially constant in vertical position with respect to said settling zone; withdrawing from a higher level within said body of water-continuous material a stream of sludge-water mixture, the water content of said sludge-water mixture being at least 80% and preferably around 98% and the rate of withdrawal of said sludge-water mixture being substantially greater than the rate at which said water-continuous material is withdrawn from the lower end of said settling zone; agitating said sludge-water mixture to at least partially resolve said sludge; and returning at least the water component of said agitated sludge-water mixture to said body of water-continuous material at a lower level therein substantially below said higher level at which said sludge-water mixture was withdrawn, thereby establishing an upward circulation within said body of water-continuous material from said lower level toward said higher level.

3. A process of settling water from a mixture thereof with oil, comprising: delivering said mixture to a settling zone for stratification into a layer of oil-continuous material, a layer of water-continuous material, and an intermediate layer of interfacial sludge comprising masses of water encased in oily material, said sludge tending to contaminate said body of water-continuous material; forming a stream of a mixture of water and sludge resulting from such stratification and in which sludge-water mixture the proportion of water is at least 80%; subjecting said stream of sludge-water mixture to substantial turbulence to vigorously agitate same and free the water of said sludge; and conducting the agitated material to a separating zone to separate the water freed from said sludge and the oily material of said sludge.

4. A process for treating a dispersion of water and oil, comprising: stratifying said dispersion in a settling zone into an oil-continuous layer, a water-continuous layer, and an intermediate layer comprising sludge; withdrawing from said settling zone a sludge-water mixture containing more than 80% of water; mechanically agitating the withdrawn sludge-water mixture; and conducting the agitated material to a second settling zone in communication at its upper and lower ends with the first settling zone.

5. A process for separating a dispersion of oil and water, comprising: stratifying the dispersion into a water layer, an oil layer, and an intermediate layer containing sludge comprising water-filled membranous sacs composed of oily material; withdrawing sludge from said intermediate layer through a passageway; supplying water to said passageway in such amount that the material advancing in said passageway contains at least 80% free water; agitating this mixture to break the membranous sacs and free the water therein; and separating the oily material from the water.

6. A process for treating a dispersion of oil and water, comprising: continuously passing the dispersion into a settling zone and there stratifying the constituents into a layer of oil, a layer of water, and an intermediate layer of sludge; separately withdrawing oil and water from the layers of these materials in said zone at such controlled rates as to maintain substantially constant the interfacial levels in said zone; withdrawing a stream of sludge-water mixture from said settling zone and consisting of at least 80% of water, the rate of withdrawal of said sludge-water mixture being substantially greater than the rate at which water is withdrawn from said layer of water to control said interfacial levels; subjecting the withdrawn stream of sludge-water mixture to agitation to at least partially resolve the sludge; and returning the agitated material to the settling zone.

7. A process for treating a dispersion of oil and water, comprising: continuously passing the dispersion into a settling zone and there stratifying the constituents into a layer of oil, a layer of water, and an intermediate layer of sludge; separately withdrawing oil and water from the layers of these materials in said zone at such controlled rates as to maintain substantially constant the interfacial levels in said zone; withdrawing a stream of sludge-water mixture from said settling zone and consisting of at least 80% water, the rate of withdrawal of said sludge-water mixture being substantially greater than the rate at which water is withdrawn from said layer of water to control said interfacial levels; subjecting the withdrawn stream of sludge-water mixture to agitation to at least partially resolve the sludge; and returning the agitated material to an auxiliary settling zone having upper and lower ends in open communication respectively with the layers of oil and water in the main settling zone to separate the constituents of the agitated mixture before return thereof to the main settling zone.

8. In combination: a tank providing a settling space enclosing stratified bodies of oil, sludge, and water and having an inlet for unresolved mixtures of water and oil, an outlet for separated oil, and an outlet for separated water; a pumping means including an intake and a discharge; a first conducting means connected with said intake of said pumping means for withdrawing a mixture of water and sludge from said tank, said first conducting means being disposed within said body of water at a position above the lowermost end of said tank and sufficiently close to said body of sludge to draw thereinto a mixture of water and sludge, at least 80% of said mixture comprising water; a second conducting means connected with said discharge of said pump for returning the discharged material to said settling space, said pumping means and said first and second conducting means constituting a circulatory system for the withdrawal of a sludge-water mixture from said settling space and the return of the pump-discharged material thereto, means associated with said circulatory system and providing a restricted passageway through which the circulating liquids flow, said passageway being sufficiently restricted in cross-sectional area to induce substantial turbulence in the liquids flowing therethrough; and means for introducing a chemical into said circulatory system for admixture with the circulating liquids.

9. In combination: a tank providing a settling space enclosing stratified bodies of oil, sludge comprising loose emulsion, and water and having an inlet for unresolved mixtures of water and oil, an outlet for separated oil, and an outlet for separated water; a pumping means including an intake and a discharge; means connected with the intake of said pumping means for withdrawing a mixture of water and sludge from said tank; a shell providing an auxiliary settling space in open communication with the main settling space at levels above and below the interfacial boundary between the stratified bodies of sludge and water; and connecting means between the discharge of said pumping means and said shell whereby the effluent of said pumping means is discharged into said shell for separation and return to the main settling space.

10. In combination: a tank providing a settling space enclosing stratified and superimposed bodies of oil and water, there being a layer of sludge in a sludge zone between said bodies of oil and water; a pumping means including an intake means and a discharge means; conducting means connected with the intake means of said pumping means and providing one or more upper orifices positioned at such a level as to communicate with said sludge and providing one or more lower orifices communicating with the water in said body of water below said sludge zone whereby said pumping means receives simultaneously the sludge moving into said one or more upper orifices and the water moving into said one or more lower orifices, said upper and lower orifices being so positioned and arranged that the sludge-water mixture reaching said pumping means is composed of at least 80% water; and a second conducting means connected with said discharge means of said pumping means and with said settling space for returning to said settling space the constituents which have passed through said pumping means.

11. A process for treating coarse interfacial sludge which tends to form in a settling zone between oil-continuous and water-continuous bodies when a dispersion of oil and water is settled and stratified in said zone, said coarse interfacial sludge comprising masses of water encased in oily material, which process includes the steps of: forming a sludge mixture comprising water and sludge, said water and sludge resulting from the settling of said dispersion in said settling zone, the total water content of said sludge mixture being at least 80% and preferably around 98%; subjecting said sludge mixture to substantial agitation to free the water of said sludge; and returning the agitated constituents of said sludge mixture to said settling zone to separate the water freed from said sludge and the oily material of said sludge.

12. A process for treating coarse interfacial sludge which tends to form in a settling zone between oil-continuous and water-continuous bodies when a dispersion of oil and water is settled in said zone, said coarse interfacial sludge comprising masses of water encased in oily material, which process includes the steps of: withdrawing from said settling zone a small amount of said sludge and a large amount of free water and subjecting the withdrawn material to substantial agitation to free the water of said sludge, the water content of the agitated material being at least 80%; and separating and returning to said settling zone the water freed from said said sludge and the oily material of said sludge.

13. In combination: a tank providing a settling zone containing stratified and superimposed bodies of oil and water, there being a layer of sludge in a sludge zone between said bodies of oil and water; means for continuously delivering an oil-water dispersion to said tank; means for withdrawing oil from said body of oil in the upper end of said tank and for withdrawing water from said body of water in the lower end of said tank; a pumping means including an intake means and a discharge means; a branching network of pipes connected to said intake means and positioned in said body of water below the lower boundary of said layer of sludge and providing orifice means positioned to draw into said branching network of pipes under the action of said pumping means a small amount of sludge and a large amount of free water from said body of water, the position of said pipe network being such as to insure that the stream reaching the intake means of said pumping means will have a water content of at least 80%; and means communicating with said discharge means of said pumping means for returning the pumped constituents to said settling zone.

LOGAN C. WATERMAN.

CERTIFICATE OF CORRECTION.

Patent No. 2,338,986.   January 11, 1944.

LOGAN C. WATERMAN.

It is hereby certified that error appears in the printed specification of the above numbered patent requiring correction as follows: Page 2, first column, line 59, for "disestabilized" read --destabilized--; page 4, first column, line 2, for "slude" read --sludge--; page 6, second column, line 44, claim 12, for "from said said" read --from said--; and that the said Letters Patent should be read with this correction therein that the same may conform to the record of the case in the Patent Office.

Signed and sealed this 23rd day of May, A. D. 1944.

Leslie Frazer (Seal)   Acting Commissioner of Patents.